Jan. 5, 1926.　　　　W. H. WHEELER ET AL　　　　1,568,433
ANCHORAGE
Filed August 15, 1924
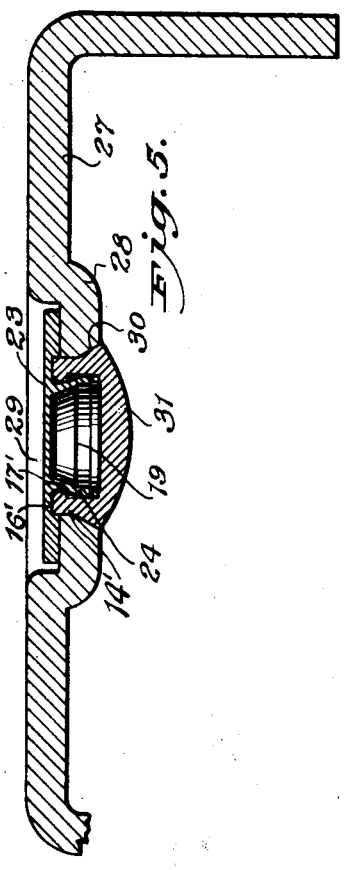
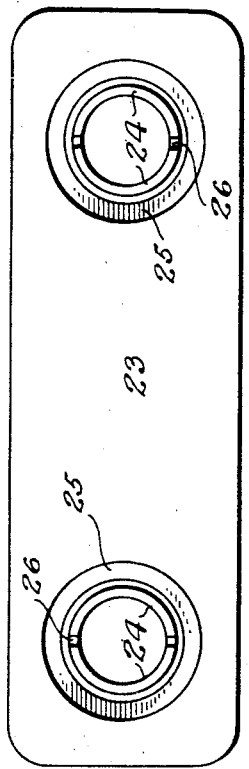
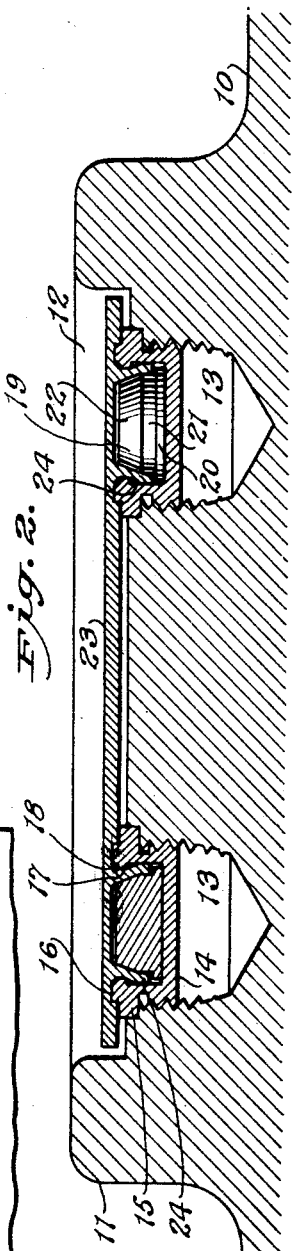
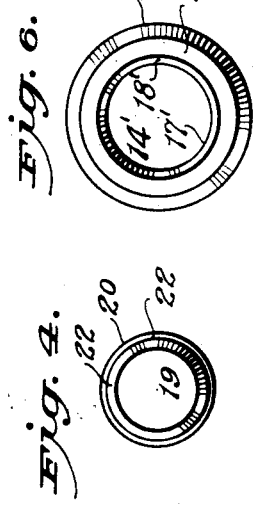
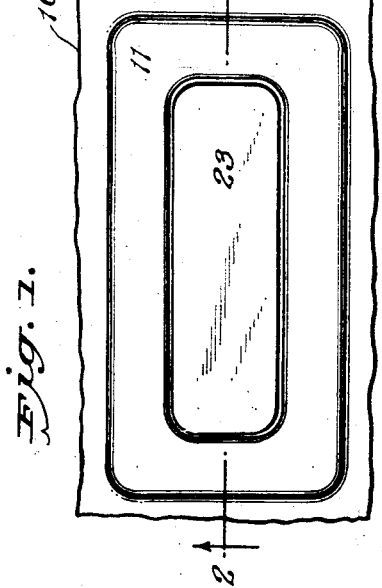
INVENTORS
William H. Wheeler
Judson C. Logan
BY
ATTORNEY Patented Jan. 5, 1926.

1,568,433

UNITED STATES PATENT OFFICE.

WILLIAM H. WHEELER, OF GLEN RIDGE, AND JUDSON C. LOGAN, OF JERSEY CITY, NEW JERSEY, ASSIGNORS TO FEDCO NUMBER PLATE CORPORATION, OF NEW YORK, N. Y., A CORPORATION OF DELAWARE.

ANCHORAGE.

Application filed August 15, 1924. Serial No. 732,268.

*To all whom it may concern:*

Be it known that we, WILLIAM H. WHEELER, a citizen of the United States, and a resident of Glen Ridge, in the county of Essex and State of New Jersey, and JUDSON C. LOGAN, a citizen of the United States, and a resident of Jersey City, in the county of Hudson and State of New Jersey, have invented a new and Improved Anchorage, of which the following is a full, clear, and exact description.

This invention relates to an improved means for anchoring a member to a suitable base in such a manner that it cannot be removed without disfiguring or mutilating the member or the base.

One specific application of our invention is the securing of plates bearing numbers or other identifying indicia to automobiles or automobile parts in such manner as to prevent removing the plate without so mutilating or damaging it as to render it unsuitable for use again, thereby preventing the shifting of plates from one automobile to another as is now commonly practiced by thieves or their accomplices to render difficult the detection and identification of stolen cars.

It is an object of our invention to provide an anchorage of very simple and inexpensive construction which can be applied with a minimum of labor.

With these and other objects in view our invention consists in certain novel features of construction and combinations of parts as will be more fully hereinafter described and defined in the claims.

In the accompanying drawings:

Figure 1 is a plan view of a plate attached to a suitable body;

Fig. 2 is a sectional view taken on line 2—2 of Fig. 1;

Fig. 3 is a bottom plan view of the plate;

Fig. 4 is a top plan view of an expander plug;

Fig. 5 is a cross sectional view of a modified form of the attaching device; and Fig. 6 is a plan view of a thimble used in said modified form of attaching device.

In Figs. 1 to 3 we show a construction specifically adapted for anchoring a name or number plate to an automobile engine but it will be evident that the same or a closely similar form of anchoring means could be used for attaching other members or parts together without departing from the scope of our invention and we do not wish to limit ourselves to the precise construction or specific application illustrated in the drawing.

In Figs. 1 and 2, the numeral 10 is used to indicate a portion of an automobile engine on which a boss 11 is cast or otherwise formed. In this boss there is a shallow recess 12 of a size to receive the plate which is to be attached. In the floor of the recess there are two threaded holes 13. Cup shaped members or thimbles 14 are screwed into the holes 13. Each thimble is provided with flange 15 near its upper end and the holes 13 are counter-sunk to provide seats for these flanges. The rim 16 of each thimble extends above the flange 15 and projects inwardly to form a lip 17. The upper face of the lip is tapered as indicated at 18.

Within the thimble 14 is placed a cylindrical plug 19 which at its lower end is formed with a flange 20 of such size as to permit the plug to be forced by the exercise of considerable pressure into the thimble past the lip 17. Hence, once the plug has been introduced into the thimble, it will not drop out and cannot readily be removed. The plug is formed with a cylindrical body portion 21 above which is a frusto-conical portion 22 which reaches up to a plane slightly below the rim of the thimble 14 when the plug is introduced into the thimble.

The plate which is to be attached to the body 10 is indicated by the numeral 23 and, as shown in Fig. 3, it is formed with two annular flanges 24 depending from its lower surface, which flanges are adapted to enter the thimbles 14 in the annular space between the thimbles and the plugs 19 therein. The tapered faces 18 assist in guiding the flanges into the thimbles. The under surface of the plate is formed with a recess 25 around each flange, adapted to receive the rim 16 of the thimble. This recess serves the double purpose of providing a zone of weakness in the plate at the point of attachment and of permitting the thimble to project above the bottom plane of the plate, the object of which will be explained below. The flanges 24 are preferably formed with slots 26 therein, so as to facilitate the spreading of the flanges when introduced into the thimbles.

In attaching a plate to an engine body, the thimbles 14 with plugs 19 therein are screwed into the holes 13 until the flanges 15 seat on the counter-sunk portions of the holes 13. The thimbles are of a size to fit tightly into the threaded holes so that there will be no danger of their working loose. When the thimbles are in place, the plate 23 is attached by inserting the flanges 24 into the annular space between the plugs 19 and the thimbles 14 and then forcing the plate against the thimbles until the rims 16 bear against the top of recesses 25 and the bottom surface of the plate 23 bears against the top of flange 15. In forcing the plate into this position, the flanges 24 are flared outwardly following the contour of plugs 19, thereby locking the plate to the thimbles as indicated in Fig. 2. It will be understood of course, that one of the plugs 19 in Fig. 2 is shown in section, while the other plug is shown in full. The flanges 24 are of a thickness to fit very tightly between the lips 17 and the portion 22 of the plug and also between the portion 21 and the inner wall of the thimble. The lips 17 bite into the flanges and prevent the latter from being withdrawn from the thimble.

The shape of the plug 19 and the fact that it is not fixed to the thimble 14 play an important part in our invention. Because the plug has freedom of motion within the thimble it can adjust itself to the flange 24 should the latter not be accurately centered with respect to the thimble. As the flange is forced down over the plug it is first flared by the frusto conical portion 22 and then pressed down into engagement with the cylindrical portion 21 seizing the latter in a firm grip. If the plug were integral with or affixed to the socket 14 it might be possible to withdraw the flange, but because the plug is free and because of the tight grip of the flange on the portion 21 the plug becomes firmly attached to the flange and will rise with the flange when the latter is drawn upward, causing the lip 17 to bite into the flange and hold it fast.

This hold is so firm that the plate 23 will tear along the area weakened by recess 25 before the lip 17 will shear through the flange.

Once the plate 23 has been attached in this manner, it cannot be removed, because the thimbles 14 are made of a very hard and tough metal tempered to such a degree as to make it impossible to cut the metal with saws, drills or other tools. Any effort to cut through the thimbles 14 would therefore be frustrated. The rim of the thimble extends so far into the plate 23 that it would be impossible for a thief to saw through the boss 11 and into the edge of the plate clear of the rim without breaking through the upper face of the plate, thereby mutilating the plate and betraying the fact that the plate had been tampered with. Any effort to pull the plate out of engagement with the thimbles would result in breaking the plate along the part weakened by the recesses 25. It would be impossible to draw the temper of the thimble 14 without sawing off the boss 11 and applying a torch to the underside of the thimble. If this were done not only would the engine body be mutilated, but also it would be impossible to draw the temper of the thimble 14 without heating the plate 23 unduly, and the surface of the plate would be discolored by the application of heat of sufficiently high temperature to draw the temper of the thimbles 14. The recess 12 in the boss 11 serves mainly to discourage the thief or his accomplices from attempting to tamper with the fastening of the plate. The recess can be dispensed with, if so desired, because the thimble is immune to attack. Any effort to turn the thimbles and unscrew them from the holes 13 into which they are threaded very snugly is resisted by the flanges 24 which are wedged so tightly between the plug and the thimble that if the thimble were turned the flanges would twist and tear out a portion of the plate 23.

In Figs. 5 and 6, we show a modified form of our invention adapted particularly for attachment of a member to a base of plate form, such as the frame members of an automobile chassis or to a panel board. Numeral 27 indicates one of the side frame members of an automobile chassis. To provide a seat for plate 23, a portion of the plate is pressed to form a boss 28 on one side and a recess 29 on the other. Holes are bored or otherwise formed through the boss 28 and these holes are conically flared on the underside as indicated in the drawing. Into each hole is fitted a thimble 14' corresponding to thimble 14 described above, having a rim 16' with inwardly projecting lip 17'. However, thimble 14' has no flange corresponding to flange 15 and the body of the thimble is not threaded but is provided with a conically flared portion 30 adapted to fit snugly into the flared part of the hole. The thimble is also formed with a thickened and rounded bottom 31. In attaching plate 23 with this type of thimble, the thimbles 14' and plugs 19 are introduced into the holes from the underside and the plate and flanges 24 are introduced from the upper side. The parts are then pressed together until the rim 16' of the thimble fits into the recess of the plate.

With this anchorage it is impossible for a thief to remove the plate for the same reasons as those obtaining with the anchorage described above. Although he has free access to the underside of the thimble he cannot draw the temper of the latter without seriously disfiguring the plate 23.

As in the case of recess 12, it is not absolutely essential to form the frame member 37 with a recess 29 to receive the plate, because even without this recess, it would be impossible to remove the plate from the frame member 27 without mutilating or disfiguring the plate or mutilating the frame.

We claim:

1. In an anchorage of the character described, a base formed with an aperture, a thimble secured in the aperture and having an inwardly projecting lip below the rim thereof, a plate formed with a recess to receive said rim and an annular flange adapted to enter the thimble, said recess forming a weakened area surrounding the flange, and an expander within the thimble adapted to expand the flange against the inner wall of the thimble when the plate is pressed home against the thimble.

2. In an anchorage of the character described, a plate formed with an annular flange and with a recess surrounding the flange providing an area of weakness in the plate, a base formed with a recess adapted to receive the plate and with a threaded aperture in the recess, a thimble adapted to be screwed into said aperture and having a rim adapted to enter the recess in the plate, the thimble being further provided with an inwardly projecting lip, and a plug within the thimble adapted to press the flange against the lip and spread the flange against the inner wall of the thimble below the lip when the plate is pressed home against the thimble.

3. In an anchorage of the character described, a plate formed with an annular flange and with a recess surrounding the flange providing an area of weakness in the plate, a base formed with a recess adapted to receive the plate and with a threaded aperture in the recess, a thimble adapted to be screwed into said aperture and having a rim adapted to enter the recess in the plate, the thimble being further provided with an inwardly projecting lip, and a plug freely movable within the thimble, the plug being formed with a frusto-conical surface adapted to spread the flange against said lip and with a cylindrical portion adapted to be seized by the flange when the plate is pressed home against the thimble.

4. In an anchorage of the character described, a plate formed with a flange, a base formed with an aperture to receive the flange, and a lip at the mouth of the aperture formed with a cutting edge adapted to bite into the flange.

5. In an anchorage of the character described, a plate formed with a flange, a base formed with an aperture to receive the flange, and a lip at the mouth of the aperture formed with a cutting edge adapted to bite into the flange, the plate being formed with an area of weakness adjacent the flange.

6. In an anchorage of the character described, a plate formed with an annular flange, a base formed with an annular aperture to receive the flange, and an inwardly projecting lip formed on the base at the mouth of the aperture, said rib having a tapering upper face and a sharp lower corner adapted to bite into the flange.

7. In an anchorage of the character described, a plate formed with an annular flange, and a base formed with an annular aperture to receive the flange, the base being undercut below the mouth of the aperture to form a cutting edge.

8. In an anchorage of the character described, a base formed with an aperture, a bushing secured in the aperture, the bushing having an inwardly projecting lip formed with a tapered upper face and a sharp lower corner, a plate formed with an annular flange adapted to be introduced into the bushing, and means within the bushing for expanding the flange against the sharp corner of the lip when the plate is pressed against the base.

9. In an anchorage of the character described, a base formed with an aperture, a thimble secured in the aperture, the thimble having an inwardly projecting lip formed with a tapered upper face and a sharp lower corner, a tapered plug within the thimble, and a plate formed with an annular flange adapted to be introduced into the thimble and be expanded by the plug against the lip and against the inner surface of the thimble below the lip when the plate is pressed against the thimble.

10. In an anchorage of the character described, a plate formed with an annular flange, a base formed with an annular aperture adapted to receive the flange, means for expanding the flange to form a conical portion and a cylindrical portion below the conical portion, and an inwardly projecting lip having a sharp corner adapted to bite into the flange above the cylindrical portion thereof.

WILLIAM H. WHEELER.
JUDSON C. LOGAN.